(12) United States Patent
Roy

(10) Patent No.: US 10,667,361 B2
(45) Date of Patent: May 26, 2020

(54) BALLAST INDEPENDENT RETROFIT LED LAMP WITH FLICKER REDUCTION CIRCUITRY

(71) Applicant: Silicon Hill B.V., Amsterdam (NL)

(72) Inventor: Shounak Roy, Maarssenbroek (NL)

(73) Assignee: Silicon Hill B.V., Amsterdam (NL)

( * ) Notice: Subject to any disclaimer, the term of this patent is extended or adjusted under 35 U.S.C. 154(b) by 0 days.

(21) Appl. No.: 16/097,374

(22) PCT Filed: Apr. 25, 2017

(86) PCT No.: PCT/EP2017/059807
§ 371 (c)(1),
(2) Date: Oct. 29, 2018

(87) PCT Pub. No.: WO2017/186723
PCT Pub. Date: Nov. 2, 2017

(65) Prior Publication Data
US 2019/0150238 A1    May 16, 2019

(30) Foreign Application Priority Data
Apr. 29, 2016    (EP) .................................... 16167599

(51) Int. Cl.
*H05B 33/08*    (2006.01)
*H05B 45/44*    (2020.01)
*H05B 45/14*    (2020.01)
(52) U.S. Cl.
CPC ............. *H05B 45/44* (2020.01); *H05B 45/14* (2020.01); *Y02B 20/386* (2013.01)
(58) Field of Classification Search
None
See application file for complete search history.

(56) References Cited

U.S. PATENT DOCUMENTS

| 7,164,238 B2 * | 1/2007 | Kazanov | ............ | H05B 37/0227 |
| | | | | 315/209 R |
| 7,279,853 B2 * | 10/2007 | Chong | ............... | H05B 41/3924 |
| | | | | 315/291 |

(Continued)

FOREIGN PATENT DOCUMENTS

| CN | 1042025863 A | 12/2014 |
| CN | 207854217 U | 9/2018 |

(Continued)

*Primary Examiner* — Crystal L Hammond
(74) *Attorney, Agent, or Firm* — Hoyng Rokh Monegier LLP; David Owen

(57) ABSTRACT

The application discloses a retrofit LED lamp (16) for replacing a fluorescent lamp in fixture having a magnetic or an electronic ballast (2). The retrofit LED lamp comprises a retrofit lamp connector (1; 1', 2; 2') for electrically connecting the retrofit lamp (16) to the ballast (2) of the fixture. Impedances (8,9) are connected between connector points of the retrofit lamp connector (1; 1', 2; 2') which correspond with connector points of filaments of the fluorescent lamp replaced. Rectifying circuitry (4,5) is coupled to the retrofit lamp connector (1; 1', 2; 2') for rectifying an AC current received from the ballast (2) via the retrofit lamp connector (1; 1', 2; 2'). LED circuitry (3) is coupled to the rectifying circuitry (4, 5). The Led circuitry (3) comprises LEDs for emitting light when energized by the rectified current received from the rectifying circuitry (4, 5). A flicker reduction circuit (6) is connectable in parallel over the LED circuitry (3) for reducing an AC component in the rectified current through the LED circuitry (3) so as to reduce a flickering of the emitted light. A switch (7) for connecting the flicker reduction circuit (6) in parallel over the LED circuitry (3). A switch control circuit (10) controls the switch (7) to keep the flicker reduction circuit disconnected during a delay period, preferably longer than 10 msec, at a begin of a start-up of the LED retrofit lamp (16) and to continuously (Continued)

connect the flicker reduction circuit (6) after the delay period in case the retrofit lamp (16) is energized by a magnetic ballast.

13 Claims, 3 Drawing Sheets

(56) References Cited

U.S. PATENT DOCUMENTS

| | | | |
|---|---|---|---|
| 7,490,957 B2* | 2/2009 | Leong | F21V 23/0471 |
| | | | 315/51 |
| 9,445,465 B2* | 9/2016 | Radermacher | H05B 33/0806 |
| 2008/0164854 A1* | 7/2008 | Lys | H05B 33/0815 |
| | | | 323/226 |
| 2012/0313540 A1* | 12/2012 | Lin | H05B 33/0884 |
| | | | 315/201 |
| 2013/0221867 A1* | 8/2013 | Deppe | H05B 33/0809 |
| | | | 315/224 |
| 2014/0159608 A1* | 6/2014 | Simi | H05B 33/0887 |
| | | | 315/205 |
| 2015/0198290 A1* | 7/2015 | Segers | H05B 33/0827 |
| | | | 315/191 |

FOREIGN PATENT DOCUMENTS

| | | |
|---|---|---|
| EP | 2602544 A | 6/2013 |
| WO | 2012139691 A | 10/2012 |

* cited by examiner

BALLAST INDEPENDENT RETROFIT LED LAMP WITH FLICKER REDUCTION CIRCUITRY

FIELD OF THE INVENTION

The invention relates to a retrofit LED lamp with flicker reduction circuitry which is configured to be energized by both a magnetic ballast or by an electronic ballast.

BACKGROUND OF THE INVENTION

Fluorescent lighting has been around for many years now. This form of lighting started out as a highly efficient alternative for incandescent light bulbs, but has recently been surpassed by LED lighting to some extent in terms of efficiency and power consumption, and also in other aspects as set out below.

Fluorescent lamps generally comprise a tube filled with an inert gas and a small amount of mercury, capped at both ends with double pinned end caps which fits in the connectors of the fixture.

For assisting the ignition of the fluorescent lamp the end caps of the fluorescent lamp contain a filament to preheat the gasses inside the tube and to vaporize the mercury. Once the fluorescent lamp is ignited, heat generated by the conducted current keeps the fluorescent lamp in operational condition. To facilitate these starting conditions and to limit current through the fluorescent lamp during operation, and thus limit the power consumed, a ballast is connected between the mains power supply and connectors of the fixture.

In installed fixtures for fluorescent lamps two different types of ballasts are used. A type of ballast which is already used since the introduction of fluorescent tube lamps is the so-called magnetic ballast. Such magnetic ballasts is a simple magnetic inductor, which limit consumed power by limiting the AC current as a result of the frequency dependent impedance of the inductor.

More recently electronic ballasts have been introduced. Such electronic ballasts usually first convert AC mains power into DC power, and subsequently convert the DC power into high frequency AC power to drive the fluorescent lamp.

Several different types of electronic ballasts are installed.

Nowadays retrofit LED lamps for replacing the conventional fluorescent tube lamps are available on the market.

US2015/0198290 discloses a low cost and efficient retrofit lamp which can be used in luminaries having a magnet ballast, but also in fixtures with an electronic ballast.

The ends of the retrofit LED lamp comprise connector pin pairs which fit in the connectors of the fixture.

Impedances are connected between the connector pin pairs. The AC current received via the connector pin pairs is rectified. The rectified current is supplied to LED circuitry comprising LEDs which emits light when energized by the rectified current.

When the retrofit lamp is energized via an magnetic ballast the frequency of the AC current supplied to the lamp is equal to the low frequency (50 or 60 Hz) of the mains voltage. The rectified current comprises an AC component with a frequency which is twice the frequency of the mains voltage. This AC component causes flickering in the emitted light. To reduce this flickering a flicker reduction circuit in the form of a capacitor is periodically connected and disconnected in parallel over the LED circuitry.

In contrary to a magnetic ballast, which all operates substantial in same way, there are many different types of electronic ballasts.

It appears that retrofit lamps provided with flicker reduction when used in combination with a magnetic ballast do not always correctly function in combination with some types of electronic ballasts.

Since the customer in general does not know which ballast is used in a fixture it is important that the can trust that a retrofit lamp will correctly function in his fixture, notwithstanding the type of ballast used in the fixture.

SUMMARY OF INVENTION

It is an object of the invention to provide a retrofit LED lamp with efficient flicker reduction in case it is used in combination with a magnetic ballast and which function reliable in combination with electronic ballasts.

This object has been achieved by a retrofit LED lamp for replacing a fluorescent lamp in fixture having a magnetic or an electronic ballast, including electronic ballasts performing a lamp present detection in a detection period at a start-up of the lamp, the retrofit LED lamp comprising a retrofit lamp connector for electrically connecting the retrofit lamp to the ballast of the fixture, impedances connected between connector points of the retrofit lamp connector which correspond with connector points of filaments of the fluorescent lamp replaced, rectifying circuitry coupled to the retrofit lamp connector for rectifying an AC current received from the ballast via the retrofit lamp connector, LED circuitry, coupled to the rectifying circuitry, and comprising LEDs for emitting light when energized by the rectified current received from the rectifying circuitry, a flicker reduction circuit connectable in parallel over at least a part of the LEDs of the LED circuitry for reducing an AC component in the rectified current through said part of the LEDs, so as to reduce a flickering of the emitted light, a switch circuit for establishing the parallel connecting connection of the flicker reduction circuit in parallel over the LED circuitry over the LEDs, and a switch control circuit for controlling the switch circuit and configured to keep the flicker reduction circuit disconnected during a delay period at a begin of a start-up of the LED retrofit lamp and to continuously connect the flicker reduction circuit after the delay period in case the retrofit lamp is energized by a magnetic ballast, whereby the detection period expires before the end of the delay period.

The invention is at least partly based on the insight that flicker reduction circuit in retrofit LED lamp negatively effects the "lamp presence"-detection as performed by several types of electronic ballasts. This detection detects whether there is an electric conducting path between the pins of pin pair. In case a fluorescent lamp is present the filament forms the electric conducting path. This detection of the presence of the electric conducting path is usually done by injecting a small current into the lamp via one pin of a pair of connector pins and checking whether the current returns via the other pin of the pin pair. An electronic ballast is designed to operate with a fluorescent lamp. In case the conducting path is detected between the pins of a connecter pair this indicates that no lamp is present or that the filament is broken. In that case the start-up procedure for the lamp will not start. By using the impedances between the pins of pin pair of the retrofit lamp it is prevented that an electronic ballast with lamp present detection will not energize the retrofit lamp.

By keeping the flicker reduction circuit disconnected at the begin of the startup, when the type of ballast is not yet known, it is prevented that the injected current for the lamp presence detection is absorbed by the flicker reduction circuit. Due to this absorption the lamp presence detection may fail and the lamp will not be started.

In case the lamp is energized by a magnetic ballast after the delay period flicker reduction is realized simply by keeping the flicker reduction continuously connected. The flicker reduction is not active for a short period at the begin of the energization by a magnetic ballast. This is only for a short period, which will not or hardly noticed by the user.

So with the retrofit lamp according to the invention a lamp is realized which in a very simple way is able to function reliable in combination with electronic ballasts, including electronic ballast with a lamp presence detection. And when used with a magnetic ballast flickering is reduced efficiently in a simple way. Preferably the delay period is longer than 10 msec. In all electronic ballasts which are currently available on the market the "lamp present" detection takes place within 10 msec. after the start-up.

It is essential that the flicker reduction circuit is disconnected in the delay period at the begin of the start-up when the lamp present detection is performed. However it is not required that the type of ballast is known. If the flicker reduction is kept disconnected during the delay period in case the lamp is used in combination with a magnetic ballast this has no notable negative effect on the function of the lamp, because the flicker reduction is activated shortly after the start up when the delay period has expired. So the period that the lamp is flickering is too short to be notices or to become annoying.

Although it is in principle not required that the flicker reduction circuit stays disconnected when the lamp is energized by an electronic ballast, but an embodiment of the retrofit lamp the switch control circuit is configured to prevent the parallel connection of the flicker reduction circuit in case the LED retrofit lamp is energized by an electronic ballast, has the advantage that the flicker reduction circuit cannot negatively affect the ballast and/or retrofit lamp in case the retrofit lamp is used in combination with an electronic ballast.

In an embodiment of the retrofit lamp the LED circuitry is switchable between a first configuration and a second configuration, whereby in the first configuration a forward voltage over the LED circuitry is higher than in the second configuration, whereby the switch control circuit is configured to establish the parallel connection of the capacitive flicker reduction circuit in dependence on the forward voltage over the LED circuitry.

In a further embodiment of the retrofit lamp the switch is a voltage controlled switch with a control input which connected via an electronic circuit configured to provide a control voltage to close the voltage controlled switch in case the forward voltage exceeds a threshold value which is higher than the forward voltage of over the LED circuitry in the second configuration of the LED circuitry.

In this embodiment use is made of the fact that that the forward voltage over the LED circuitry is dependent on the type of ballast used, so that in a simple way it is achieved that the flicker reduction circuit stays inactive when the retrofit lamp is used in combination of an electronic ballast.

In a further embodiment of the retrofit lamp the switch control circuit comprises a RC chain defining the delay of the connection of the flicker reduction circuit, which switch control circuit has an output connected to the control input of the switch via a Zener diode, whereby the switch control circuit is dimensioned such that in case the forward voltage exceeds the threshold the control voltage to the switch is blocked by the Zener diode. This embodiment has the advantage that a very limited number of components are required for the control of the switch.

BRIEF DESCRIPTION OF THE DRAWINGS

These and other aspects of the invention will be apparent from and elucidated further with reference to the embodiments described by way of example in the following description and with reference to the accompanying drawings, in which.

DETAILED DESCRIPTION OF EMBODIMENTS

Figure 1:
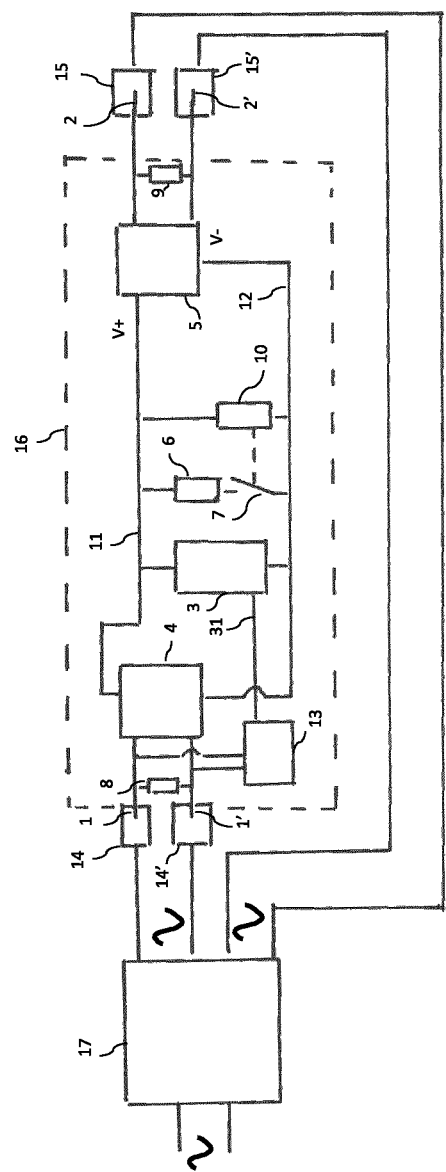
FIG. 1 shows an embodiment of a retrofit LED lamp according to the invention.

For the energization of fluorescent different two types of ballast are used, a so-called magnetic ballast or a so-called electronic ballast. A magnetic ballast comprises an inductance coil which is connected between the mains voltage and the lamp to reduce the AC voltage.

An electronic ballast converts the low frequency main voltage (50 or 60 Hz) into a high frequency (above 20 kHz) supply voltage for the fluorescent lamp.

When a fluorescent lamp is replaced by a retrofit LED-lamp the optimal operation conditions of the LED lamp are different for the two types of ballasts. A major difference is the frequency of the supply voltage. When energized by magnetic ballast this is the frequency of the mains voltage (50 or 60 Hz), whilst in case of electronic ballasts this frequency is above 20 kHz.

When energized by a magnetic ballast the low frequency of the supply voltage causes a flickering of the light emitted. The flickering has a frequency of twice the frequency of the supply voltage. Lamp flickering with these frequencies can be experienced annoying. So measures to reduce this flickering are desired. Note that due to the high frequency of the supply voltage of an electronic ballast these measures are superfluous when the LED-lamp is energized by an electronic ballast.

This low frequency flickering for a magnetic ballast energized LED lamp can be reduced by connecting a flicker reduction circuit in parallel the LED circuitry. As flicker reduction circuit a filter can be used which forms a bypass of the LED circuitry for current with frequencies which cause the flickering. In its simples form such filter can comprise only one capacitor.

Several types of electronic ballasts are provided with a so-called lamp present detection feature. The lamp present detection is performed before the ignition of a fluorescent lamp. In case the lamp presence detection fails to detect the presence of the lamp the ignition procedure for the lamp start up procedure will not be continued in order to prevent damages to the electronic ballast.

The lamp present detection is usually done by detecting the presence of a filament between the two pins of the pin pair at the end of the fluorescent lamp. This is usually done by injecting a small current into the lamp via one connector pin of a pair of connector pins located and checking whether the current returns via the other one of the pair of connector pins.

In order to achieve that a retrofit LED lamp is detected by the electronic ballast an impedance similar to the impedance between the connector pins of a florescent lamp is connected between the connector pins of a retrofit Led lamp. The inventor discovered that retrofit LED lamps with a flicker reduction circuit which are designed to operate in combination with both a magnetic ballast or an electronic ballast often fails to switch on when fixed in a fixture with an electronic ballast.

The inventor came to the insight that this failure is caused by the flicker reduction circuit. This flicker reduction circuit absorbs the major part of the current injected for the lamp present detection into the one of the pins of the pin pairs. Consequently no or hardly no return current flows back to the electronic ballast. So the presence of the lamp is not detected and the lamp fails to start up.

FIG. 1 shows an embodiment of a retrofit LED lamp 16 according to the invention in which the cause of this failure has been eliminated. The retrofit LED 16 lamp has dimensions and a connector which correspond with those of a fluorescent tube lamp, so that it can be fixed in a fixture designed for a fluorescent tube lamp. The connector comprises pin pairs 1; 1' and 2; 2' which are electrically connected with the connectors 14; 14' and 15; 15' of the fixture when the retrofit lamp 16 is fixed in the fixture.

The retrofit LED lamp 16 is then connected with a ballast 17 for energizing the retrofit LED lamp 16. Inputs of the ballast are connectable to the mains voltage in an usual manner. Outputs of the ballast are connected to the connectors 14; 14' and 15; 15' of the fixture. When connected to the mains the ballast supplies an AC current to the retrofit LED lamp via pin pairs 1; 1' and 2; 2'.

For enabling the lamp present detection of electronic ballasts an impedance 8 is connected between the pins 1 and 1' and an impedance 9 is connected between the pins 2 and 2'. The connection points of the impedances corresponds with the connection points at which the filaments of a fluorescent lamp are connected.

The value of the impedance 8 an 9 is within the range of the impedance values of the filaments of a fluorescent lamps. This enables the detection of a lamp by an electronic ballast provided with a lamp detection feature.

The Retrofit LED lamp 16 comprises rectifying circuitry comprising full wave rectifiers in the form bridge rectifiers 4 and 5 of usual type which are connected to the connector pins 1; 1' and 2, 2'. The bridge rectifiers 4 an 5 supply a rectified current to LED circuitry 3, which comprises LEDs which emit light when energized by the current received from the bridge rectifiers 4 and 5 via a supply line 11 with a positive voltage V+ and supply line 12 with a negative voltage V−. Besides a DC component the rectified current supplied by the rectifiers 4 and 5 comprises an AC component with a frequency which is twice the frequency of the AC current supplied by the ballast 2. This AC component causes variations in the emitted light. In case the LED circuitry 3 is energized by an electronic ballast these variations are not visible because of the high frequency of the AC-component. However in case the LED circuitry is energized by a magnetic ballast this frequency is so low that it can be annoying for the user. In order to reduce the amplitude of the flicker a flicker reduction circuit 6 is used. This flicker reduction circuit 6 can be connected in parallel over the LED circuitry 3 by means of an electronic switch circuit for example in the form of a switch 7 which is connected in series with the flicker reduction circuit 6. The flicker reduction circuit 6 has an impedance which low for the frequencies in the range around 100-120 Hz, which frequencies corresponds with twice the usual frequency of the mains voltage. This is the frequency of ground harmonic of the AC component in the current supplied by the bridge rectifiers 4 and 5. The impedance for DC is very high so that DC current through the flicker reduction circuit 6 is blocked. Consequently the AC current substantially bypasses the LED circuitry 3. In its simplest form the flicker reduction circuit 6 exists of a single capacitor, but more complex filters can be used which blocks the DC and let pass currents with a frequency in the range of 100-120 Hz.

The flicker reduction circuit 6 and the switch 7 are connected in parallel with the LED-circuitry 3. A switch control circuit 10 provides a control signal to the switch 7 to open or close the switch 7. The switch control circuit 10 is connected between the supply lines 11 and 12. The default state of the switch 7 is open. The switch control circuit 10 is of type that provides a delayed control signal for closing the switch with a delay with respect to the moment that the circuit is energized via the supply lines 11 and 12. The delay time is chosen longer than the time which is required for the lamp present detection.

When the lamp is switched on the switch control circuit 10 takes care that the switch 7 is not closed before the delay time has expired. Since this delay time is longer than the time interval required for the "lamp present detection". So the flicker reduction circuit cannot disturb the "lamp present"-detection.

Preferably the delay period is longer than 10 msec, because all lamp present detection circuit in the electronic ballasts which are currently on the market are finalized within 10 msec. after the begin of the start-up. A practical value for the delay period is 500 msec.

The switch 7 is open at the moment that retrofit LED lamp is switched on. In case the retrofit LED lamp 16 is used in combination with a magnetic ballast then shortly after the switch-on the switch 7 is closed by the switch control circuit 10. So the flicker reduction becomes active with a short delay and will stay active for the rest of the time that until the lamp is switched off again.

Figure 2:
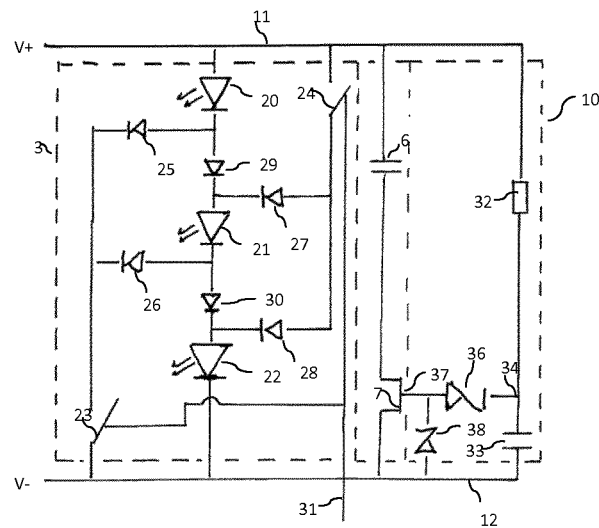
FIGS. 2 and 3 show an embodiment of the LED circuitry, the flicker reduction circuit and the switch control circuit for use in the retrofit lamp in more detail.

FIG. 2 shows an embodiment of the LED circuitry 3, the flicker reduction circuit 6 and the switch control circuit 10 in more detail. Symbols 20, 21 and 22 represent strings of a plurality of LEDs which are connected in series. The LED circuitry 3 is further provided with electronic switches 23 and 24 and diodes 25, . . . , 29 which enable that the LED circuitry 3 to be brought in a first configuration and a second configuration.

In the first configuration the switches 24 and 25 are open. In this configuration the LED strings 20, 21 and 22 are connected in series.

In this embodiment the number of LEDs in each LED string is 14, which corresponds with a forward voltage of 42 Volt for each string. The forward voltage of the complete LED circuitry in the first configuration is then 126 Volt. As described in e.g. US2015/0198290 126 Volt is a very suitable operation voltage for a retrofit LED lamp which is used in combination with a magnetic ballast.

In the second configuration the switches 23 and 24 are closed, resulting in that the LED strings 20, 21, 22 are connected in parallel. With 14 LED per LED strings this makes the forward voltage of the complete LED circuitry equal to 42 Volt. 42 Volt is a very suitable operation voltage for a retrofit LED lamp which is used in combination with an electronic ballast.

The electronic switches 23 and 24 are controlled via a control signal which is provided via control signal line 31. The control signal can be provided by means of a manually operated switch which is located on the outside of the retrofit LED lamp. Preferably the control signal for the switches 23 and 24 is generated automatically by means of a detector circuit which detects the type of ballast (magnetic or electronic) on the basis of the properties of the AC-signal received from the ballast. A very suitable property of the AC signal for discriminating between an electronic ballast and a magnetic ballast the frequency of the AC current received from the ballast. As already mentioned before the frequency of this AC current is 50 or 60 Hz for a magnetic ballast and is above 20 kHz for an electronic ballast.

In FIG. 1 is the detector for discriminating between an electronic ballast and a magnetic ballast is indicated by reference sign 13. Detectors which make use of other properties of the voltage and/or current supplied by the ballast to the lamp are possible, as described e.g. in application US2015/0198290.

The configurable LED circuitry 3 of FIG. 2 is a very efficient and low cost. However other configurable LED circuitry can be used for adapting the LED circuitry to operation voltages to the type of ballast. Any configurable LED circuitry can be used in which the number of LEDs connected in series between the supply lines 11 and 12 can be changed.

The switch 7 in FIG. 2 is a voltage controlled electronic switch, such a s a FET. The switch control circuit 10 shown in FIG. 2 comprises a resistor 32 which connects the supply line 11 with the supply line 12 via a capacitor 33. A cathode of a Zener diode 36 is connected with a joint 34 between resistor 32 and capacitor 33. A control input 37, such as a gate of the FET, is connected to the anode of Zener diode 36. A cathode of Zener diode 38 is connected with control input 37 and the anode of the Zener diode 38 is connected with the supply line 12. The Zener diode 38 is used to clamp the voltage on the gate of the FET-switch 7 to prevent damages to the FET switch 7, whereby the break through voltage of the Zener diode 38 is the control voltage required to close the switch 7. The break through voltage of Zener diode 36 plus the break through voltage of Zener diode 38 is higher than the forward voltage over the LED circuitry in the second configuration in which the LED groups 20, 21 and 22 are connected in parallel, but lower than the forward voltage over the LED circuitry in the first configuration in which the LED groups 20, 21 and 22 are connected in series. When the retrofit lamp 16 is switched on the switches 23 and 24 are open, so that the flicker reduction circuit 61 is disconnected, and consequently the flicker reduction circuit 60 does not influence the lamp present detection. After the lamp is switched on a DC voltage comes available over the supply lines 11 and 12 and the capacitor 33 is loaded via the resistor 32. The voltage over the capacitor will increase.

In case the retrofit LED lamp is connected to a magnetic ballast the configuration of the LED circuitry 3 the switches 23 and 24 are set in the open state (as shown in FIG. 2), resulting in that the LED strings 20, 21 and 22 are connected in series. The voltage between the supply lines 11 and 12 is than substantial equal to the forward voltage over the LED strings 20, 21 and 22. This voltage is higher than the sum of the breakthrough voltages of the Zener diodes 36 and 38. The voltage over the capacitor 33 increases until the Zener diodes 36 and 38 becomes conducting and the switch 7 is closed. This makes the flicker reduction circuit 6 active with a delay.

Figure 3:
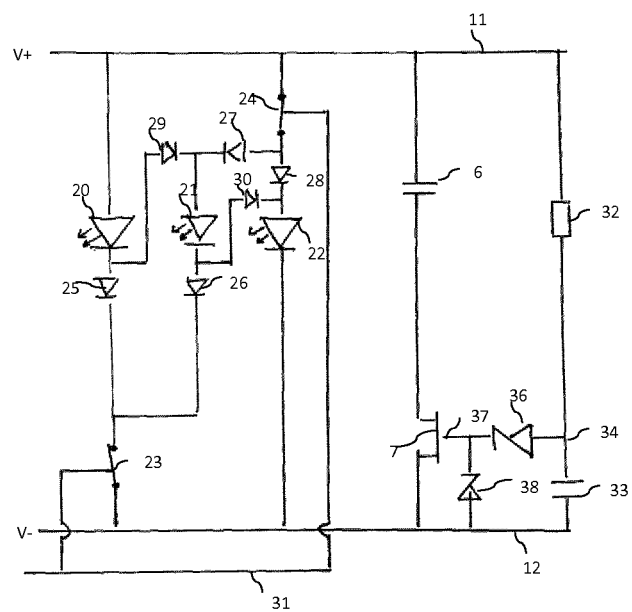

FIG. 3 shows the same circuitry as FIG. 2, but in a configuration to be energized by an electronic ballast. In this configuration the switches 23 and 24 are closed, so that the LED strings are connected in parallel between the supply lines 11 and 12. In this situation the voltage between the supply lines is substantial equal to the forward voltage of a single LED string. Since this voltage is lower than the sum of break through voltages of the Zener diodes the voltage over the capacitor 33 will not reach the level required for closing the switch 7. So the flicker reduction circuit 6 stays inactive after the switch on of the lamp.

Figure 4:
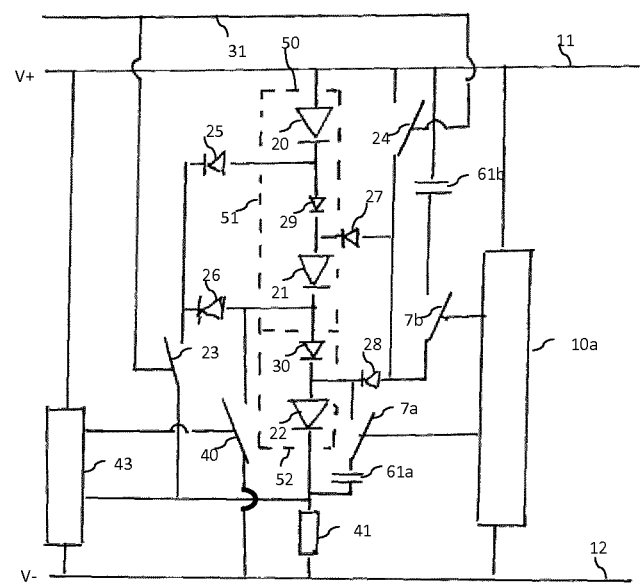
FIG. 4 shows circuitry for an embodiment for use in a retrofit lamp which is provided with line regulation.

FIG. 4 shows circuitry for use in another embodiment of the retrofit LED lamp according to the invention, which is provided with a line regulation circuit for regulating the power consumption by the LED retrofit lamp when the retrofit lamp is energized by a magnet ballast. Such line regulation circuit is disclosed US2015/0198290. The line regulation circuit comprises a sensor 41 for sensing the current flowing from supply line 11 to supply line 12 through a chain 50 comprising LED strings 20, 21 and 22. The chain 50 of LED strings comprises a first sub chain 52 formed by the LED string 22 and diode 30 and a second sub chain 51 formed by the LED strings 20 and 21 and diode 29.

The line regulation circuit further comprises a switch 40 which is connected in parallel over the first sub chain 52 and a control circuit 43. The control circuit 43 controls the switch 40 in dependence on the current sensed by sensor 41, such that the sub chain is periodically bypassed. By bypassing the first sub chain 52 the voltage between the supply lines resulting in a reduced power consumption of the retrofit LED lamp. For a detailed description of the function of the power regulation reference is made to US2015/0198290.

The flicker reduction circuit in the embodiment of FIG. 4 comprises a first part 61a and a second part 61b. Part 61a of the flicker reduction circuit can be connected in parallel over the LED string 22 in the first sub chain 52 by means of a switch 7a. Part 61b of the flicker reduction circuit can be connected in parallel over the LED strings 20 and 21 in second sub chain 51 by means of a switch 7b. A switch control circuit 10a controls the switches 7a and 7b. The function of control circuit 10a is similar to the function of control circuit 10. When the retrofit LED lamp starts up the switches 7a and 7b are open. In case the retrofit LED lamp is energized by a magnet ballast the switches 7a and 7b are closed after a delay time and the parts 61a and 61b of the flicker reduction circuit becomes active.

When the retrofit LED lamp is energized by an electronic ballast the switches 7a and 7b are not closed and the parts 61a and 61b of the flicker reduction circuit stays inactive.

Dividing the flicker reduction circuit into separate parts, whereby each part is connectable over the LED strings in one of the sub chains, has the benefits that the variations of the voltage over the components of the flicker reduction circuit, due to the line regulation, stay limited. This has a positive effect on the life time of these components, in particular to capacitors, in the flicker reduction circuit. In FIG. 4 the parts 61a and 61b of the flicker reduction circuit are formed by single capacitors. However other circuits which has a frequency characteristic with a high impedance for DC and a substantial lower impedance for frequencies which are twice the mains frequency can be used. In FIG. 4 both the first and second sub chain are provided with flicker reduction circuitry. However in case only one of the sub chains is provided with flicker reduction circuitry this already results in flicker reduction.

The embodiment of the switch control circuit 10 shown in FIG. 2, FIG. 3 and FIG. 4 has the benefits that in case of the use of an electronic ballast the flicker reduction circuit is kept inactive during the complete period that the retrofit LED lamp is energized by the electronic ballast. So the flicker reduction circuit cannot negatively affect the functioning of the electronic ballast and/or retrofit LED lamp 16.

However also switch control circuits can be used which only delay the connection of the flicker reduction circuit the beginning of the startup of the lamp suffices. Essential is that during the lamp present detection the flicker reduction circuit is disconnected.

And even in this situation the influence of the flicker reduction circuit can be limited in case a flicker reduction circuit is used in the form of a band filter which has a high impedance value for DC and high frequencies, but has a low impedance value for frequencies in the range of 100-120 Hz.

The LED circuitry described in FIG. 2, FIG. 3 and FIG. 4 are of a configurable type in which the retrofit LED lamp is adapted to the ballast by changing the forward voltage over the LED circuitry. Although this is a very efficient and low cost concept the invention is not limited to embodiments with this type of LED circuitry. For example embodiments of lamps whereby the configuration of the LED circuitry is the same for both types of ballasts can be used. The energizing of the LED circuitry can be done via circuits which have frequency dependent impedances. The impedances are chosen such that the impedances have a high value for low frequencies and have a low value for high frequencies so as to adapt the impedance values to the type of ballast. Embodiments of such circuits with a frequency dependent input impedances are described in European patent application 15193399.1. The invention is applicable for each type of retrofit lamp with flicker reduction circuitry which disturbs the lamp presence detection performed by an electronic ballast.

In the embodiments of the lamps shown in FIGS. 2 and 3 the flicker reduction circuit is kept disconnected in case the lamp is energized by an electronic ballast. This has the advantage that the flicker reduction circuit cannot influence the operation of the lamp. However disconnection of the flicker reduction circuit when the lamp is operated in combination with an electronic ballast is not required.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit can fulfil the functions of several items recited in the claims. The mere fact that certain measures are recited in mutually different dependent claims does not indicate that a combination of these measures cannot be used to advantage. Any reference symbol in the claims should not be construed as limiting the scope.

The invention claimed is:

1. A retrofit LED lamp for replacing a fluorescent lamp in fixture having a magnetic or an electronic ballast, including electronic ballasts performing a lamp present detection in a detection period at a start-up of the lamp, the retrofit LED lamp comprising:

a retrofit lamp connector for electrically connecting the retrofit lamp to the ballast of the fixture, impedances connected between connector points of the retrofit lamp connector which correspond with connector points of filaments of the fluorescent lamp replaced, rectifying circuitry coupled to the retrofit lamp connector for rectifying an AC current received from the ballast via the retrofit lamp connector, LED circuitry, coupled to the rectifying circuitry, and comprising LEDs for emitting light when energized by the rectified current received from the rectifying circuitry, a flicker reduction circuit connectable in parallel over at least a part of the LEDs of the LED circuitry for reducing an AC component in the current through said part of the LEDs so as to reduce a flickering of the emitted light, a switch circuit for establishing the parallel connection of the flicker reduction circuit over the LEDs, and a switch control circuit for controlling the switch circuit and configured to keep the flicker reduction circuit disconnected during a delay period at a begin of a start-up of the LED retrofit lamp and to continuously connect the flicker reduction circuit after the delay period in case the retrofit lamp is energized by a magnetic ballast, whereby the detection period expires before the end of the delay period.

2. The retrofit lamp as claimed in claim 1, whereby the delay period is longer than 10 msec.

3. The retrofit lamp as claimed in claim 2, whereby the delay period is longer than 500 msec.

4. The retrofit LED lamp according to claim 1, whereby the switch control circuit is configured to prevent the parallel connection of the flicker reduction circuit in case the LED retrofit lamp is energized by an electronic ballast.

5. The retrofit LED lamp according to claim 1, whereby the LED circuitry is switchable between a first configuration and a second configuration, whereby in the first configuration a forward voltage over the LED circuitry is higher than in the second configuration, whereby the switch control circuit is configured to establish the parallel connection of the capacitive flicker reduction circuit in dependence on the forward voltage over the LED circuitry.

6. The retrofit LED lamp according to claim 5, arranged to form in the first configuration a chain comprising in series connected LEDS, which chain is divided in at least a first and second sub chain, a line regulation circuit for periodically bypassing the first sub chain, whereby the flicker reduction circuit comprises a part which is connectable in parallel over the LEDs in the first sub chain and/or a part which connectable in parallel over the LEDs in the second sub chain whereby the switching circuit is arranged to establish the parallel connection of the parts(s) of the flicker reduction circuit.

7. The retrofit LED lamp as claimed in claim 5, whereby the switch circuit is a voltage controlled switch with a control input which connected via an electronic circuit configured to provide a control voltage to close the voltage controlled switch in case the forward voltage exceeds a threshold value which is higher than the forward voltage of over the LED circuitry in the second configuration of the LED circuitry.

8. The retrofit LED lamp as claimed in claim 7, whereby the switch control circuit comprises a RC chain defining the delay of the connection of the flicker reduction circuit (6), which switch control circuit has an output connected to the control input of the switch via a Zener diode, whereby the switch control circuit is dimensioned such that in case the forward voltage does not exceed the threshold the control voltage to the switch is kept blocked by the Zener diode.

9. The retrofit LED lamp as claimed in claim 5, whereby the LED circuitry comprises strings of in series connected LEDs and configuration switches for connecting groups of LED strings in series in the first configuration and for connecting these groups of LED strings in parallel in the second configuration.

10. The retrofit LED lamp as claimed in claim 9, comprising a detector circuit for detecting whether the retrofit LED lamp is energized via magnetic ballast or an electronic ballast and for controlling the configuration switches to bring the configuration of the LED circuitry in the first configuration when a magnetic ballast is detected and to bring the LED circuitry in the second configuration when an electronic ballast is detected.

11. The retrofit LED lamp as claimed in claim 1, whereby the flicker reduction circuit is a capacitor.

12. The retrofit lamp as claimed in claim 1, further comprising a detector for discriminating between an electronic ballast and a magnetic ballast on the basis of the voltage and/or current supplied by the ballast to the lamp.

13. A method of operating a retrofit LED lamp for replacing a fluorescent lamp in fixture having a magnetic or an electronic ballast, including electronic ballasts performing a lamp present detection in a detection period at a start-up of the lamp, wherein the retrofit LED lamp comprises:
- a retrofit lamp connector for electrically connecting the retrofit lamp to the ballast of the fixture,
- impedances connected between connector points of the retrofit lamp connector which correspond with connector points of filaments of the fluorescent lamp replaced,
- rectifying circuitry coupled to the retrofit lamp connector for rectifying an AC current received from the ballast via the retrofit lamp connector,
- LED circuitry, coupled to the rectifying circuitry, and comprising LEDs for emitting light when energized by the rectified current received from the rectifying circuitry, and
- a flicker reduction circuit connectable in parallel over at least a part of the LEDs of the LED circuitry for reducing an AC component in the current through said part of the LEDs so as to reduce a flickering of the emitted light,
- wherein the method comprises keeping the flicker reduction circuit disconnected during a delay period at a begin of a start-up of the LED retrofit lamp, and to continuously connecting the flicker reduction circuit after the delay period in case the retrofit lamp is energized by a magnetic ballast, whereby the detection period expires before the end of the delay period.

\* \* \* \* \*